United States Patent [19]

Roberts

[11] Patent Number: 4,482,368
[45] Date of Patent: Nov. 13, 1984

[54] AIR CLEANING ASSEMBLY INCLUDING A FASTENING ASSEMBLY HAVING A NOVEL WING NUT CONSTRUCTION

[75] Inventor: Mark T. Roberts, Oregon, Wis.

[73] Assignee: Nelson Industries, Inc., Stoughton, Wis.

[21] Appl. No.: 470,273

[22] Filed: Feb. 28, 1983

[51] Int. Cl.³ .................. B01D 46/24; F16B 39/34; F16B 37/16

[52] U.S. Cl. .................................. 55/480; 55/496; 55/502; 55/503; 411/303; 411/369; 411/435; 411/903

[58] Field of Search ............... 55/328, 480, 493, 496, 55/502, 503; 411/303, 368, 369, 371, 373, 377, 378, 411, 412, 424, 427, 429, 432, 435, 542, 544, 900–904, 907–909

[56] References Cited

U.S. PATENT DOCUMENTS

| | | | |
|---|---|---|---|
| 248,975 | 11/1881 | Wootten | 411/303 |
| 750,675 | 1/1904 | Michelin | 411/432 |
| 1,547,463 | 7/1925 | Styan | 411/429 |
| 1,797,766 | 3/1931 | Frye | 411/435 |
| 2,450,694 | 10/1948 | Sauer | 411/303 |
| 3,273,441 | 9/1966 | Biesecker | 411/429 |
| 3,289,724 | 12/1966 | Ernest | 411/303 |
| 4,300,928 | 11/1981 | Sugie et al. | 55/502 |
| 4,373,842 | 2/1983 | Bettini et al. | 411/377 |
| 4,388,091 | 6/1983 | Khosropour | 55/337 |

FOREIGN PATENT DOCUMENTS

| | | | |
|---|---|---|---|
| 29566 | 3/1977 | Japan | 411/908 |
| 665544 | 1/1952 | United Kingdom | 411/908 |

Primary Examiner—David Lacey
Attorney, Agent, or Firm—Andrus, Sceales, Starke & Sawall

[57] ABSTRACT

An improved fastening assembly having application for securing a filter element within an air cleaner and incorporating a novel wing nut construction. As used with an air cleaner, the wing nut is engaged with a large diameter threaded portion of a connecting bolt and acts to secure a filter element within an air cleaner housing, while an outer knob is engaged with a smaller diameter threaded section of the bolt and bears against a cover to secure the cover to a housing. The wing nut is provided with an inner threaded metal section which is molded within an outer plastic wing section. The inner nut portion includes a plastic ring having an inner diameter slightly less than the thread on the nut and serves to seal against the thread on the bolt and prevent leakage of air along the threaded connection, as well as preventing the loosening of the threaded connection due to vibration. In addition, the nut is provided with an enlarged base, which bears against the cap, and a cylindrical shank that projects through the opening in the cap and prevents direct contact between the threaded bolt and the cap.

11 Claims, 3 Drawing Figures

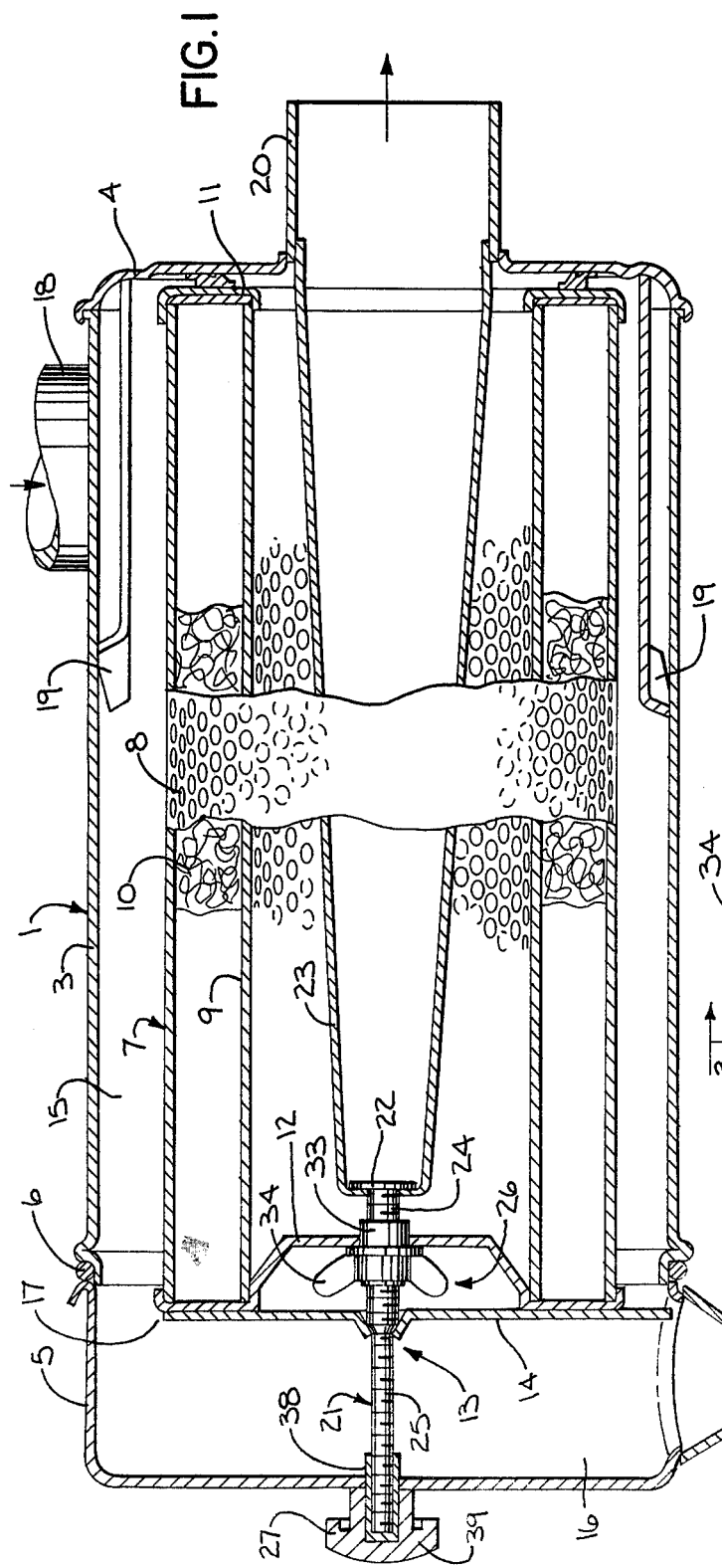
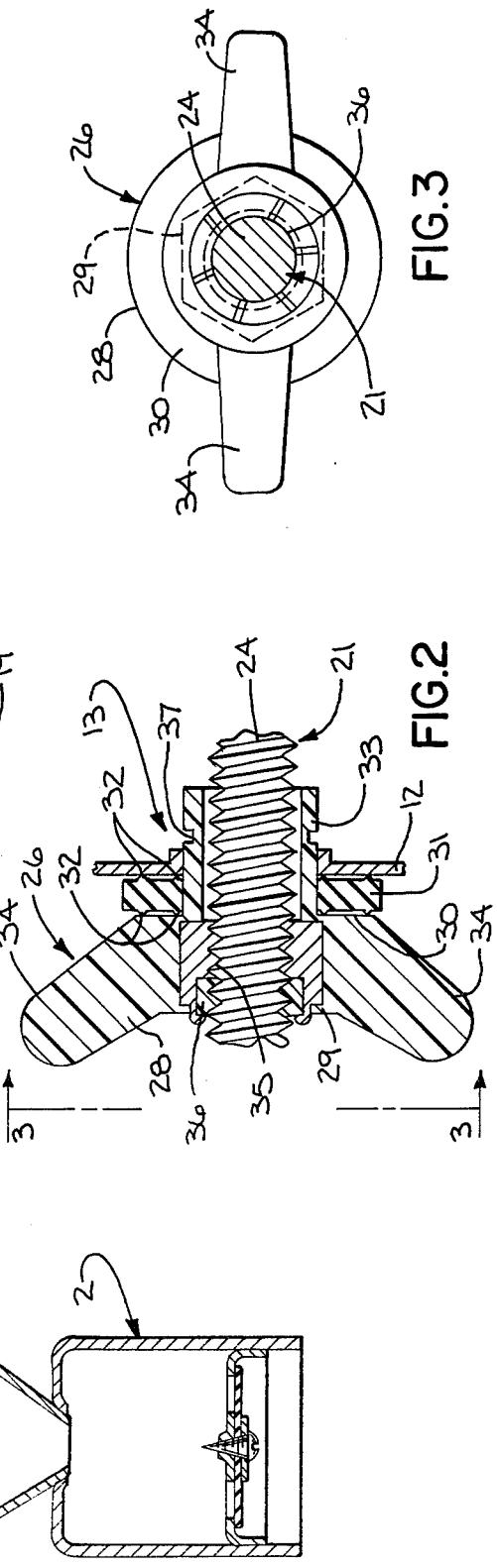

AIR CLEANING ASSEMBLY INCLUDING A FASTENING ASSEMBLY HAVING A NOVEL WING NUT CONSTRUCTION

BACKGROUND OF THE INVENTION

Air cleaners are normally used in conjunction with an internal combustion engine to filter dust and other foreign material from the air before the air is introduced into the engine. With off-road equipment, such as tractors, bulldozers, and the like, which are exposed in service to extremely dusty conditions, a dust dumping valve is frequently utilized which will collect the dust in the air cleaner and automatically dump the dust to the exterior when the dust has collected to a predetermined amount.

Patent application Ser. No. 06/287,888, filed Jul. 29, 1981, now U.S. Pat. No. 4,388,091, assigned to a common assignee discloses an air cleaner assembly having a dust dumping valve. As shown in the aforementioned patent application, the air cleaner includes an outer generally cylindrical housing having an open end enclosed by a cover and a cylindrical filter element is spaced inwardly of the housing. Air is introduced into the annular space between the housing and the filter element and is swirled outwardly by louvers or vanes. The air passes inwardly through the filter element for discharge to the engine, while the heavier particles, such as dust or foreign material, are swirled outwardly against the inner surface of the housing for collection in a dust dumping valve assembly.

In the air cleaner of the type described in the aforementioned patent application, the air filter element is secured within the housing by a bolt assembly. The head of the bolt is engaged with a strap which extends within the central opening of the filter element and is connected to the closed end of the housing. The bolt, which has a uniform diameter and is threaded throughout its length, extends through aligned openings in the end of the filter element and in the housing cover. A wing nut is secured to the bolt and bears against the cap to secure the element tightly against the closed end of the housing, while an outer knob is threaded onto the outer end of the bolt and secures the cover to the open end of the housing.

In the past, plastic wing nuts formed of glass filled nylon, or the like, have been used to secure the element in the housing. However, plastic wing nuts of this type tend to gall as they are threaded on and off of the metal bolt and also tend to loosen due to the extreme vibrations encountered in off-road equipment.

Metal wing nuts have also been employed in the past to secure the filter element in the housing. As in the case of the plastic wing nut, the metal wing nut tends to loosen due to vibration and does not provide a positive seal, so that air and dust can flow outwardly along the threaded connection.

SUMMARY OF THE INVENTION

The invention is directed to an improved fastening assembly having use in securing a filter element within an air cleaner and incorporating a novel wing nut construction. As utilized with an air cleaner, the fastening assembly includes a metal bolt and the head of the bolt is disposed within the hollow interior of the filter element and is engaged with the end of the strap that is connected to the closed end of the housing of the air cleaner. The bolt is provided with an inner larger diameter threaded section which is located adjacent the head and extends through an opening in the cap of the filter element, and an outer smaller diameter threaded section which extends through an opening in the cover for the housing.

The wing nut is engaged with the larger diameter threaded portion of the bolt and bears against the cap to secure the element to the closed end of housing, while an outer knob is threaded on the smaller diameter outer end of the bolt and bears against the cover to secure the cover to the housing.

The wing nut, as used in the invention, is composed of an outer plastic wing section which is molded around a threaded metal inner nut section. The outer plastic section is provided with an enlarged base which bears against the outer surface of the cap, and a cylindrical shank or hub extends inwardly from the base and projects through an opening in the cap to prevent metal-to-metal contact between the threaded bolt and the cap. The shank protects the threaded bolt against wear or abrasion which would occur due to engine vibration if the bolt merely projected freely through the opening in the cap.

The inner metal nut section of the wing nut is threaded and is provided with a plastic ring which is located axially of the thread and has an internal diameter slightly less than the thread. When the wing nut is threaded onto the larger diameter section of the bolt, the plastic ring will be deformed to provide a positive seal along the threaded joint, as well as firmly securing the nut to the bolt, so that the nut will not loosen due to engine vibration.

The two-step bolt diameter enables the wingnut to be slipped freely over the smaller diameter outer section and then threaded onto the larger diameter inner section. This construction greatly facilitates the installation and removal of the wing nut for replacement of the filter element.

The fastening assembly can be used in a wide variety of applications where it is desired to secure two members together, and particularly where such members are exposed in use to vibrational stress and dusty conditions.

Other objects and advantages will appear in the course of the following description.

DESCRIPTION OF THE DRAWINGS

The drawings illustrate the best mode presently contemplated of carrying out the invention.

In the drawings:

FIG. 1 is a longitudinal section of an air cleaner incorporating the fastening assembly of the invention;

FIG. 2 is an enlarged longitudinal section of the wing nut as connected to the bolt; and FIG. 3 is a section taken along line 3—3 of FIG. 2.

DESCRIPTION OF THE ILLUSTRATED EMBODIMENT

FIG. 1 illustrates a fastening assembly used with an air cleaner 1 for an internal combustion engine and having an automatic dust dumping valve 2. The air cleaner and dust dumping valve 2 can be constructed in a manner as described in the copending U.S. application, Ser. No. 06/287,888, filed Jul. 29, 1981.

In general, the air cleaner 1 includes an outer generally cylindrical housing 3 which is closed at one end 4 and has an opposite open end which is adapted to be enclosed by a cup-shaped cover 5. Housing 1 and cover 5 are provided with mating flanges which are sealed by gasket, 6.

Mounted within the housing is a self-contained filter element 7 composed of a pair of spaced concentric perforated tubes or bodies 8 and 9 which border an annular fibrous filter medium 10, The ends of the filter element 7 are enclosed by end caps 11 and 12 and end cap 11 is sealed to the end of housing 3 by a gasket. A fastening assembly 13, which will be described in greater detail hereinafter, is employed to secure filter element 7 to the closed end 4 of the housing, as well as to secure the cover 5 to the open end of the housing 3.

A divider wall 14 extends transversely across the interior of cover 5 and divides the air cleaner into a filter chamber 15 and a dust collecting chamber 16. Wall 14 is provided with a notch or cut-out portion 17 that provides communication between the chambers along the inner surface of the cover.

The dust dumping valve 2 is mounted in the housing 3 and straddles the divider wall 14. Dust dumping valve 2 operates in the manner described in the aforementioned patent application, to collect dust and to automatically dump or discharge the dust when it has accumulated to a predetermined amount.

Air is introduced into the housing through an inlet 18 and is swirled outwardly within the chamber 15 by a plurality of vanes or louvers 19. The air then passes inwardly through the filter medium 10 and is discharged through an outlet 20. The heavier particles, such as dust and foreign material, are swirled outwardly against the cylindrical wall of housing 3 and pass through notch 17 into chamber 16 and are subsequently collected in the dust dumping valve 2.

In accordance with the invention, the fastening assembly 13 includes a metal bolt 21 having a head 22 which is located within the central interior of the filter element 7. The head 22 is engaged with the outer end of a generally U-shaped strap 23 which is connected to the closed end 4 of the housing. Bolt 21 extends through aligned openings in the strap 23, cap 12, wall 14 and outer cover 5, as best illustrated in FIG. 1.

Bolt 21 is formed with a larger diameter inner threaded section 24 which extends through the opening in cap 12 and an outer smaller diameter threaded section 25 which extends outwardly through an opening in the cover 5. Wing nut 26 is engaged with the larger diameter threaded section 24, while knob 27 is engaged with the outer smaller diameter end of the bolt, as shown in FIG. 1. Threading down of wing nut 26 will secure element 7 tightly against the closed end 4 of the air cleaner housing 3, while threading down of the outer knob 27 will secure the cover 5 tightly against the open end of housing 3.

As a feature of the invention, wing nut 26 is composed of an outer plastic wing section 28 formed of ABS plastic or the like, and an inner metal threaded nut section 29 formed of steel or the like. The nut section 29 has an outer polygonal shape, or other surface irregularities, which serves to interlock the nut section 29 to the outer wing section 28.

As best shown in FIG. 2, wing section 28 is provided with an enlarged base 30 which bears against a resilient washer 31 made of a material such as polyurethane or the like, that is interposed between the base 30 and the outer surface of cap 12. The washer is preferably formed with a pair of outwardly projecting, concentric sealing ridges 32 on both the outer and inner surfaces and when the wing nut 26 is threaded down, the ridges will be deformed to provide an air tight seal between the wing nut 26 and the cap 12.

The outer wing section 28 is also provided with a shank or hub 33 that projects axially inwardly through the opening in the cap 12. Bolt 21 extends freely through the central opening in shank 33. Shank 33 prevents metal-to-metal contact between bolt 21 and the circular edge of cap 12 bordering the opening therein, and thus prevents abrasion, or actual severing of the bolt by the circular edge, under severe vibrational conditions.

Wing section 28 is also provided with a pair of outwardly extending wings 34 which are adapted to be grasped by the operator in order to tighten and loosen the wing nut.

The inner metal nut section 29 is formed with a thread 35 which is adapted to engage the large diameter threaded section 24 of the bolt, and a plastic, pressure deformable ring 36 is located axially adjacent the outer end of the thread 35. Ring 36 can be retained in nut section 29 by staking. The internal diameter of the plastic ring 36 is slightly less than the internal diameter of the crest of thread 35 so that when the wing nut 26 is turned down onto the bolt, the plastic ring 36 will be deformed to provide a positive seal along the threaded joint. Deforming of the plastic ring 36 also aids in improving the mechanical connection between the wing nut 26 and bolt 21 and prevents loosening of the wing nut due to engine vibration. The hub or shank portion 33 of the wing section 28 can be provided with a peripheral groove 37 to receive a retaining ring.

As shown in FIG. 1, knob 27 is formed with an inner metal section 38 having a threaded bore that engages the outer section 25 of bolt 21, and an outer plastic section 39.

While the drawings have illustrated the fastening assembly as being utilized with an air cleaner, it is contemplated that the fastening assembly can be utilized in various applications where it is desired to secure two members together. Similarly, while the wing nut 26 is shown to be used with a two-step bolt, it can also be utilized with a bolt of uniform diameter.

Various modes of carrying out the invention are contemplated as being within the scope of the following claims particularly pointing out and distinctly claiming the subject matter which is regarded as the invention.

I claim:

1. An air cleaner assembly, comprising an outer housing having an open end, said housing having an air inlet and an air outlet, a cover positioned and arranged to enclose the open end of the housing, a filter element spaced radially inward of the housing and disposed between said inlet and outlet whereby air will flow from said inlet through said filter element to said outlet, said filter element including a filtration medium and a cap engaging the filter element and spaced axially from said cover, a fastening assembly securing the filter element within the housing and fastening the cover to said housing, said fastening assembly including a bolt having a head and a threaded stem, means for connecting the head to the housing, said stem extending through a first opening in the cap and a second aligned opening in said cover, a wing nut having an outer exposed plastic wing section and a metal inner threaded nut section having an internal thread engaged with the threaded stem, said wing nut bearing against said cap and securing said element to said housing, a deformable plastic ring disposed axially adjacent the thread on said nut section, said ring having an internal diameter less than the crest of the thread on said nut section and being deformed as said wing nut is threaded onto said stem to thereby provide a seal along the threaded connection, a shank formed integrally with said wing section and extending through said first opening in said cap, and an outer knob engaged with the outer end portion of said stem and bearing against the cover for securing the cover to the open end of said housing.

2. The air cleaner assembly of claim 1, and including an enlarged base formed integrally with said wing section and bearing against the outer surface of said cap.

3. The air cleaner assembly of claim 1, wherein said stem is provided with a larger diameter inner section located adjacent said head and a smaller diameter outer section, said wing nut being engaged with said larger diameter inner section and said knob being engaged with the smaller diameter outer section.

4. An air cleaner assembly, comprising a housing having an open end, a cover positioned and arranged to enclose the open end of the housing, a filter element spaced radially inward of the housing to provide an annular space, said filter element including a filtration medium and an end cap enclosing an end of said filter element and spaced axially of said cover, means for introducing air into the annular space between the housing and the filter element, outlet means in the housing for discharging air passing through said filter element, a fastening assembly connecting the element to the housing and connecting the cover to said housing, said fastening assembly including a bolt having a head and a threaded stem, means disposed within the filter element for connecting said head to said housing, said stem extending through aligned openings in said cap and said cover, said stem having a larger diameter inner section located adjacent said head and a smaller diameter outer section, a wing nut having an outer plastic wing section and a metal inner threaded nut section engaged with the large diameter inner section of said stem, said wing nut bearing against the outer surface of said cap to secure the element to said housing, a plastic ring located axially adjacent the threaded nut section and having an inner diameter such that threading of said wing nut on said inner section of said stem will deform said ring to provide a seal along the threaded joint, and a knob threadedly engaged with the small diameter outer section of the stem and bearing against the outer surface of the cover to secure the cover to the housing.

5. A fastening assembly for connecting two members together, comprising a threaded element, and a wing nut engaged with said threaded element, said wing nut having an outer exposed plastic wing section and a metal inner threaded nut section engaged with said threaded element, said wing nut also including a pressure deformable ring located axially adjacent the threaded nut section and having an inner diameter such that threading of said wing nut on said threaded element will deform said ring to provide a seal along the threaded joint, said outer wing section having an enlarged base positioned and arranged to bear flatwise against a first of said members and a shank extending axially from said base and having a central opening to freely receive said threaded element, said shank constructed and arranged to prevent direct contact between said threaded element and said first member.

6. The assembly of claim 5, wherein said wing section is disposed radially outward of said nut section and is provided with at least two laterally extending wings to be grasped by the user.

7. The assembly of claim 5, wherein said nut section is constructed so as to provide means for mechanically locking said nut section to said wing section.

8. The assembly of claim 7, wherein said deformable ring is disposed at one end of the thread on said nut section and said shank extends axially from the opposite end of said thread.

9. The assembly of claim 5, and including an annular sealing ring disposed against said base and having a central aperture, said shank extending through said aperture, said ring having at least one deformable ridge disposed concentric with the axis of said ring and disposed to be deformed when the wing nut is tightened down on said threaded element.

10. The assembly of claim 9, wherein said sealing ring has a pair of ridges on opposite faces, one pair of ridges engaged with said base and the other pair of ridges positioned and arranged to engage said first member.

11. A wing nut, comprising an outer exposed plastic wing section, a metal inner threaded nut section disposed within said outer section and mechanically interlocked therewith, said nut section having an internal thread, and a pressure deformable ring located axially adjacent the threaded section and having an inner diameter such that threading of said wing nut on a threaded element will deform said ring to provide a seal along the threaded joint, said outer wing section having an enlarged base and a tubular shank extending axially from said base and having a central opening axially aligned with the opening in said nut section, said deformable ring being disposed at one end of the thread on said nut section and said shank extending axially from said opposite end of said thread, the inner diameter of said shank being greater than the inner diameter of said ring whereby the inner diameter of said shank will be spaced radially from said threaded element.

* * * * *